UNITED STATES PATENT OFFICE.

JOHN BÉNÉ, OF BROOKLYN, NEW YORK.

IMPROVEMENT IN THE TREATMENT OF HAIR.

Specification forming part of Letters Patent No. 184,577, dated November 21, 1876; Reissue No. 7,850, dated August 21, 1877; Reissue No. 8,637, dated March 25, 1879; application filed March 4, 1879.

*To all whom it may concern:*

Be it known that I, JOHN BÉNÉ, of the city of Brooklyn, in the county of Kings and State of New York, have invented certain Improvements in the Treatment of Hair, of which the following is a specification:

This invention relates to the treatment of all kinds of coarse hair, which, in its natural state, has little commercial value, and is entirely unfit for toilet uses and purposes.

The said treatment serves, mainly, to refine the hair or reduce the diameter of the hairs, and to render them more pliable and glossy; but it also serves to partially bleach the hair or lighten its color or tint, and fit it to pass through any of the ordinary dyeing processes, whereby it may be given any shade or color desired or possible.

In carrying out my invention, for the purpose of producing from the coarse, harsh hair above mentioned a soft, pliable hair of fine texture, I treat the said coarse hair to a bath composed of such chemicals or chemical substances as will dissolve away a portion of the surface of each hair, and thus reduce its diameter.

I find that a solution of a chlorine salt dissolved in an excess of muriatic acid serves my purpose as a bath for this refining treatment; and I prefer to employ about one ounce of chlorate of potash dissolved in four quarts of muriatic acid. This compound I prepare in a vat, jar, or other suitable vessel, and into it the hair is dipped and manipulated until the desired degree of fineness is obtained.

This process is applicable to hair of any color, the action of the chemicals being substantially the same in all cases; but the darker shades are brought to a lighter hue, and the shades of color so obtained may be retained, or the hair, after refining, be dyed in the usual manner.

In the practical use or application of the above process, muriatic is the acid preferably employed; but where the hair is to be bleached to a lighter hue than is possible by the above method, a more intense bath is employed. In addition to the muriatic acid this bath may consist of either nitric, sulphuric, or hydrofluoric acid, with bichromate of potash; and I prefer to employ a compound composed of the following ingredients, in about the following proportions, namely: To sixteen quarts of warm water add four to six ounces of hydrofluoric acid, one ounce of sulphuric acid, four quarts of muriatic acid, and four to six ounces of bichromate of potash. Into this bath the hair is placed until it is bleached to the color or shade desired.

To permanently set or fix the color or shade thus obtained, I employ a bath composed of the following ingredients, in about the proportions named: To four gallons of warm water add one quart solution muriate of tin, one ounce bisulphite of soda, and four ounces of muriatic acid.

The refined and bleached hair is immersed in this bath and manipulated until the color is firmly set.

As a finishing treatment for removing all impurities I wash the hair in a final bath of water and ammonia, after which it is dried and made ready for market.

The hair, after being subjected to the above treatment, loses its original harshness, and assumes a soft, silky texture, with a brilliant luster, which is permanently retained.

This treatment is applicable not only to coarse grades of human hair, but also to hair from the manes and tails and other parts of animals, the same result being attained in all cases—that is, a product rivaling the finest human hair.

I claim as my invention—

1. The method of refining all grades of coarse hair, which consists in subjecting it to the action of chemicals, whereby the surface of each hair is corroded or dissolved away and its diameter reduced, substantially as set forth.

2. The method of refining coarse hair, which consists in subjecting it to the action of a bath composed of muriatic acid, in which is dissolved a chlorine salt, substantially as set forth.

3. The method of refining and bleaching all kinds and grades of coarse hair, which consists, first, in bathing and manipulating the same in a chemical bath composed of acid and a chlorine salt, and then in a bleaching-bath composed of acids and bichromate of potash, substantially as and for the purposes set forth.

4. The method of refining and bleaching all kinds and grades of coarse hair, which consists, first, in bathing and manipulating the same in a bath composed of acid and a chlorine salt, which refines the hair; second, subjecting the refined hair to a bath composed of acids and bichromate of potash; and, third, subjecting the hair thus refined and bleached to the proper shade to a fixing-bath composed of warm water, solution of muriate of tin, bisulphite of soda, and muriatic acid, which sets the color, substantially as set forth.

5. The method of refining and treating hair, which consists in first passing it through a refining-bath composed of an acid and a chlorine salt; then, if desired or necessary, through bleaching and fixing baths, as above described, and finally treating the hair so refined to a bath composed of water and ammonia, to remove all of its impurities, substantially as specified.

6. As a new article of commerce and manufacture, hair of fine texture produced from any grade of coarse hair, either animal or human, by the method of refining, substantially as herein described.

In witness whereof I have hereunto set my hand this 28th day of February, 1879.

JOHN BENÉ.

Witnesses:
JOHN U. SHORTER,
E. B. LANSING, Jr.